United States Patent [19]

Dahlem

[11] Patent Number: 4,802,516
[45] Date of Patent: Feb. 7, 1989

[54] NOZZLE LOCK GAS CAP

[76] Inventor: David F. Dahlem, 901 Gatewood Dr., Enfield, Conn. 06082

[21] Appl. No.: 84,488

[22] Filed: Aug. 12, 1987

[51] Int. Cl.$^4$ ............................................. B65D 51/24
[52] U.S. Cl. ........................... 141/392; 220/DIG. 33; 251/90; 74/526
[58] Field of Search ............... 220/DIG. 33; 141/392, 141/390, 98, 1; 251/90; 74/526; 222/566, 472, 473; 70/167, 168, 169

[56] References Cited

U.S. PATENT DOCUMENTS

| 4,210,181 | 7/1980 | Clevenger | 141/392 |
| 4,236,552 | 12/1980 | Rayboy | 141/98 |
| 4,245,682 | 1/1981 | Agnew, Sr. | 141/392 |
| 4,544,007 | 10/1985 | Abraham | 141/392 |
| 4,644,984 | 2/1987 | Abraham | 141/392 |
| 4,722,375 | 2/1988 | Fox | 141/392 |

Primary Examiner—Henry J. Recla
Assistant Examiner—Ernest G. Cusick
Attorney, Agent, or Firm—Richard C. Litman

[57] ABSTRACT

A gas cap containing an elliptical flange such that the flange can be inserted into a nozzle housing of a fuel dispensing device, and rotated to accommodate a variety of different nozzle configurations and yet still provide a means to control the rate at which fuel is dispensed. The elliptical flange element has a concaval surface or recess disposed circumferentially thereto, such that a trigger/handle of a gasoline pump nozzle housing is disposed within said elliptical flange concaval recess, said trigger/handle being stabilized thereby. The gas cap device has a threaded extension that is weighted to provide the device with an asymmetrical center of gravity, such that, as the fuel dispensing actuates to shut off the flow of fuel, the device rotates out of said nozzle handle.

5 Claims, 2 Drawing Sheets

NOZZLE LOCK GAS CAP

FIELD OF INVENTION

This invention relates to automotive gas caps and, in particular, to a gas cap that may be temporarily affixed to the nozzle handle of a fuel dispensing pump such that the nozzle handle is locked, and is held open, while the user checks the oil and the such.

BACKGROUND OF THE INVENTION

Self-service gas stations have almost replaced the full service station in the American economy. People today pump their own gas, check their own oil, and clean their own windshield. The construction of conventional nozzle handles, in some cases, provide an adjustment flow mechanism that could be locked open until a vapor sensing device within the nozzle was actuated, causing the flow of fuel to stop.

Many such nozzle mechanisms, however, do not have any fuel flow adjustment attached to it, thus the customer must manually hold the nozzle open while the fuel is being pumped. People have tried to insert their existing gas caps into the nozzle mechanisms, but the trigger handle of the nozzle is so constructed that these conventional gas caps will fall out. Gas caps do not stay wedged within the nozzle handle to hold the trigger open.

The present device relates to gas caps and more particularly to a gas cap that is designed to assist the self-service customer by allowing the user to insert the apparatus into a nozzle handle such that the pump continuously operates, until the users tank is full; at which point the pump shuts off.

The present invention also relates to a means for allowing the pump to deactuate, (i.e. to shut off), when the tank is full such that the customer doesn't have to worry about the tank overflowing.

DESCRIPTION OF THE PRIOR ART

The following cited references are found to be exemplary of the U.S. prior art. They are:

| U.S. Pat. No. | Inventor |
| --- | --- |
| 4,236,552 | Rayboy |
| 4,544,007 | Abraham |
| 4,644,984 | Abraham |

U.S. Pat. No. 4,236,552, issued to Rayboy, discloses a gasoline pump clip cap that contains a C-shaped clip incorporated into the rear or handle portion of the gas cap. This clip can be temporarily installed onto the handle of a gasoline pump to maintain the flow of gas after manual pressure has been removed.

U.S. Pat. No. 4,544,007 issued to Abraham, discloses a gasoline cap for gasoline pump flow control. The filler neck gas cap is utilized as a prop for maintaining the lever of a gasoline pump dispensing nozzle in an open position. Resilient material is secured to opposite positions of the gas cap. The resilient material increases the coefficient of friction between the gas cap and nozzle handle and its guard when interposed therebetween while the lever or trigger is in a nozzle open position.

U.S. Pat. No. 4,644,984, issued to Abraham, teaches a construction for a self-service gas cap. Recesses are formed on the handle of the gas cap to engage the lever of a gasoline pump dispensing nozzle, holding it in an open position.

SUMMARY OF THE INVENTION

A primary object of this invention is to provide a means for maintaining the flow of gasoline from a pump by utilizing the gas cap as a nozzle handle holding device. The device, being inserted into the nozzle handle means of the pump, sustains a continuous rate of fuel flow, while the user performs other maintenance functions on the vehicle.

Another object of this invention is to provide a means for permitting the user to regulate the flow from a gasoline dispensing pump.

A still further object of the present invention is to provide a means for disengaging from the nozzle as the conventional shut-off mechanism actuates to turn off the flow of fuel.

These, together with other objects and advantages of the invention, reside in the details of the process and the operation thereof, as is more fully hereinafter described and claimed. References are made to drawings forming a part hereof, wherein like numerals refer to like parts throughout.

DESCRIPTION OF THE PREFERRED EMBODIMENT

Figure 1:
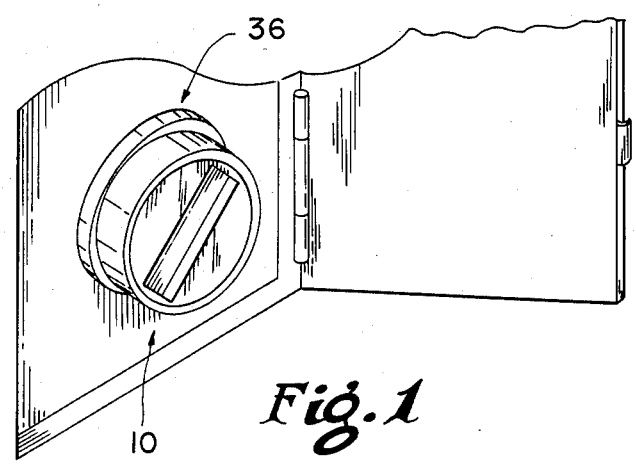
FIG. 1 is a detail view of the gas cap in use as the cap for an automobile.

Referring now to FIGS. 1 through 5, gas cap 10 includes an elliptical flange 12 having a first planar surface 20, and a second planar surface 22 substantially parallel to one another, said first planar surface 20 having a gas cap handle 18 disposed thereon.

Figure 2:
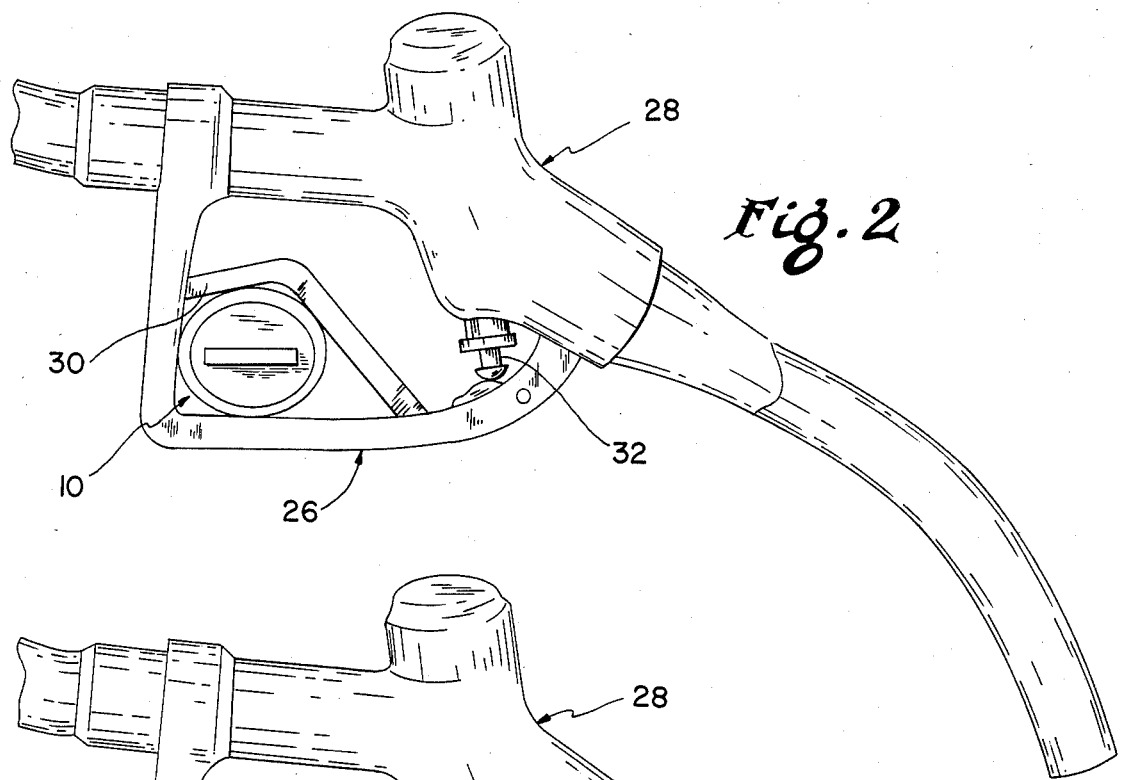
FIG. 2 is an elevational side view of the gas cap, in a tyical nozzle application.
Figure 3:
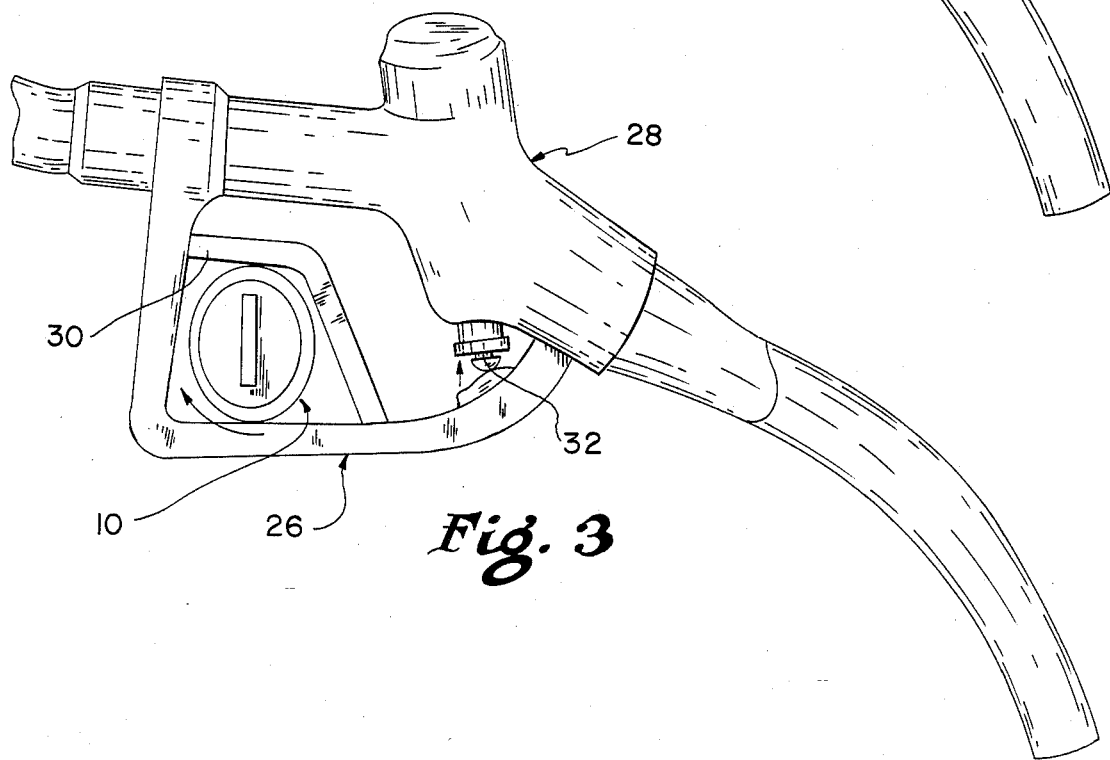
FIG. 3 is an elevational side view of the gas cap, illustrating its use while locking the nozzle handle in place.
Figure 4:
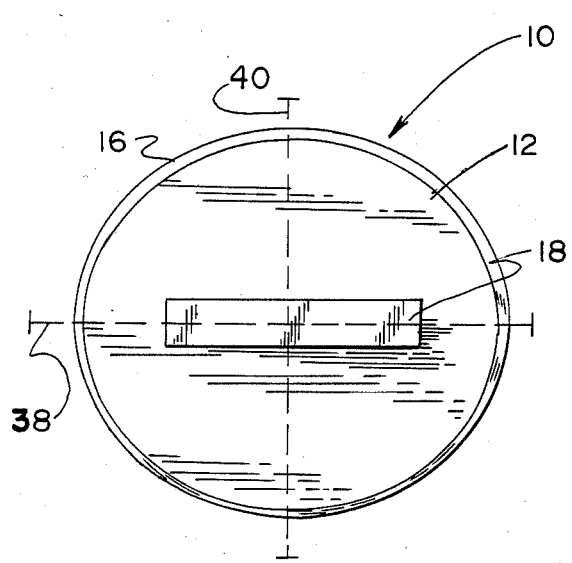
FIG. 4 is an enlarged front planar view of the gas cap.
Figure 5:
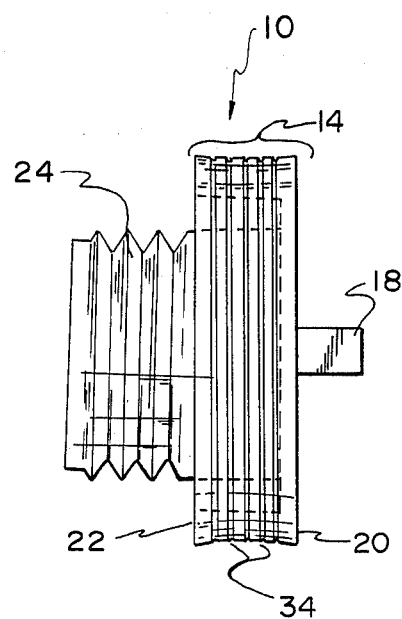
FIG. 5 is an enlarged side view of the gas cap illustrating the circumferentially disposed concave-shaped recess, with a plurality of longitudinal grooves or runners therein.

As seen in FIGS. 2 and 3, gas cap handle 18 is rigidly affixed to elliptical flange 12 such that the user may position the gas cap 10 within the nozzle handle housing 26 of a gas dispensing pump 28 and rotate cap handle 18 to upwardly displace the operative trigger/handle mechanism 32 of the nozzle handle housing 26. The degree of displacement of the trigger/handle 30 is a function of the elliptical shape of flange 12 (i.e., the major axis 38 and the minor axis 40 of the flange 12). If the handle 18 is substantially at right angles to the arc of trigger/handle 30 displacement, the trigger/handle 30 will be displaced upwardly higher in the nozzle housing 26 as elliptical flange 12 is correspondingly rotated and the flow of fuel thereby increased in varying amounts.

Additionally, elliptical flange 12, may be used with gas dispensing means from a variety of manufacturers; the elliptical flange 12 compensates for small differences in the vertical displacement of trigger/handles from the stop or rest position.

Elliptical flange 12 has a circumferentially disposed concave-shaped recess 14 around its periphery between said first and second planar surfaces as shown. The rounded concave-shaped bottom of the trigger/handle 30, is typically designed for the human hand to wrap the finger thereabout, while the gas dispensing means is in use. Trigger/handle 30 is seated in said circumferentially disposed concave-shaped recess 14 of elliptical flange element 12 such that gas cap 10 is stabilized between said trigger/handle and nozzle handle housing 26.

Elliptical flange element 12, being of sufficient thickness or width, adapts to a variety of trigger/handle configurations such that the gas cap 10 may be utilized with a wide variety of fuel dispensing pumps.

Elliptical flange 12 has a threaded curvilinear extension 24 rigidly affixed to its second planar surface 22. Said threaded curvilinear extension 24 is also disposed opposingly to cap handle 18 which is attached to the first planar surface 20 of flange 12.

Threaded curvilinear extension 24 has means for securing the gas cap 10 into a gas tank outlet orifice 36. Additionally, threaded extension 24 is weighted, causing the gas cap 10 to tumble from its stabilized position between trigger/handle 30 and nozzle housing 26 as the trigger/handle mechanism 32 shuts off the supply or flow of fuel.

The vapor pressure reactive mechanism, common in today's fuel dispensing pumps, utilizes a well-known technology to shut off the supply or flow of fuel as vapor pressure builds to a preset level in the nozzle. This mechanism causes the trigger/handle 30 in the nozzle housing 26 to lift abruptly upward, as the vapor reactive mechanism is actuated.

It is this characteristic of the conventional gas pump dispensing means that this invention addresses in the asymmetrical weighting of threaded extension 24. The asymmetrical weighting causes the gas cap to tumble from its stabilized or seated position as the trigger/handle 30 is abruptly; displaced upward when the vapor mechanism is actuated.

Pliable material or covering 16 may be circumferentially applied to the outer surface of flange 12, such that it functions to provide an improved frictional or resistive surface to further prevent the nozzle handle trigger 30 from prematurely disengaging therefrom. Longitudinal grooves or runners 34 may be disposed throughout material 16 to aid in maintaining the device 10 within the nozzle handle housing 26. The longitudinal grooves or runners 34 also allow water to pass through; such that a frictional or resistive surface can be maintained during inclement weather.

It will be apparent that the objects and advantages of the device have been achieved and further that many small changes will occur to one skilled in the art. Therefore, the foregoing disclosure is by way of illustration and example of the principles of the device, the scope of invention being limited only by the claims.

I claim:

1. A gas cap, comprising:
   an elliptical flange element having a first planar surface and a second planar surface and a circumferentially disposed concave-shaped recess around the periphery of said elliptical flange element between said first and second planar surfaces;
   said elliptical flange element including a gas cap handle element disposed on said first planar surface, thereby providing means for applying torque to said elliptical flange element; and
   a threaded curvilinear extension rigidly affixed to said second planar surface, and disposed opposingly to said gas cap handle element; whereby,
   said flange element may be employed within a nozzle housing of a gasoline dispensing means having a trigger/handle, such that the elliptical flange element displaces said trigger/handle of said dispensing means in varying amounts due to the elliptical shape of the flange element, allowing thereby an adjusted flow of fuel from the dispensing means, said trigger/handle being seated in said circumferentially disposed concave-shaped recess of said flange element such that the gas cap is stabilized between the trigger/handle and said nozzle housing.

2. A gas cap according to claim 1 wherein, said elliptical flange element has a width such that trigger handles of the gasoline dispensing means fit into said concave-shaped recess, such that said gas cap is stabilized within the dispensing means between the trigger/handle and the nozzle housing.

3. A gas cap according to claim 1 wherein, said flange element has a pliable material covering disposed circumferentially thereon, whereby said gas cap is stabilized within the dispensing means between the trigger/handle and the nozzle housing.

4. A gas cap according to claim 3 wherein, said pliable material covering includes a plurality of longitudinal grooves or runners disposed thereon, providing said flange element greater frictional contact with the trigger/handle such that the gas cap is stabilized withini the dispensing means between the trigger/handle and the nozzle housing.

5. A gas cap according to claim 1 wherein,
   the gasoline dispensing means includes a vapor-pressure reactive mechanism to shut off flow from the dispensing means when the vapor pressure builds to a preset level; and
   said gas cap is asymmetrically weighted such that said gas cap tumbles from its stabilized position between the trigger/handle and the nozzle housing as the vapor-pressure mechanism actuates, thus causing the trigger/handle to be abruptly displaced upwardly thereby, releasing contact with said gas cap.

* * * * *